(12) United States Patent
Aalto (10) Patent No.: US 9,125,239 B2
(45) Date of Patent: Sep. 1, 2015

(54) CIRCUIT SWITCHED DOMAIN SERVICES WITH LONG TERM EVOLUTION/SYSTEM ARCHITECTURE EVOLUTION ACCESS

(75) Inventor: Mika Aalto, Espoo (FI)

(73) Assignee: Nokia Technologies oy, Espoo (FI)

( * ) Notice: Subject to any disclaimer, the term of this patent is extended or adjusted under 35 U.S.C. 154(b) by 1404 days.

(21) Appl. No.: 12/007,650

(22) Filed: Jan. 14, 2008

(65) Prior Publication Data

US 2008/0214190 A1  Sep. 4, 2008

Related U.S. Application Data

(60) Provisional application No. 60/880,965, filed on Jan. 18, 2007.

(51) Int. Cl.
| | |
|---|---|
| H04L 12/66 | (2006.01) |
| H04W 92/02 | (2009.01) |
| H04W 8/04 | (2009.01) |
| H04W 88/14 | (2009.01) |
| H04W 92/04 | (2009.01) |

(52) U.S. Cl.
CPC ............... *H04W 92/02* (2013.01); *H04W 8/04* (2013.01); *H04W 88/14* (2013.01); *H04W 92/045* (2013.01)

(58) Field of Classification Search
USPC ...................... 455/435.1, 436, 437, 442, 443; 370/352, 331
See application file for complete search history.

(56) References Cited

U.S. PATENT DOCUMENTS

| | | | |
|---|---|---|---|
| 7,526,320 B2 * | 4/2009 | Semper .......................... 455/560 |
| 2006/0114885 A1 * | 6/2006 | Baek et al. ..................... 370/352 |
| 2008/0037515 A1 * | 2/2008 | Sander .......................... 370/352 |
| 2008/0159223 A1 * | 7/2008 | Palat et al. .................... 370/331 |
| 2008/0287131 A1 * | 11/2008 | Ju et al. ......................... 455/439 |

OTHER PUBLICATIONS

3GPP TS 25.331 V7.3.0 (Dec. 2006), "3rd Generation Partnership Project; Technical Specification Group Radio Access Network; Radio Resource Control (RRC); Protocol Specification (Release 7)", 1,316 pages.
International Search Report PCT/IB2008/000071 dated Aug. 11, 2008.
Vodafone; "Single Radio Voice Call Continuity"; 3GPP TSG SA WG2 S2-063159; pp. 1-8; Aug. 2006.
O2; "Voice Service Support"; 3GPP TSG SA WG2 S2-062047; pp. 1-4; Jun. 2006.

(Continued)

*Primary Examiner* — Justin Lee
(74) *Attorney, Agent, or Firm* — Harrington & Smith (57) ABSTRACT

An apparatus and method including attaching a user equipment to a long term evolution system and simultaneously registering the user equipment attached to the long term evolution system to a circuit switched domain, is disclosed. The user equipment is simultaneously registered based on an interface between a mobility management entity and a mobile switching center server. For a mobile originated call from the user equipment attached to the long term evolution system, an enhanced call control is carried via the mobility management entity to the mobile switching center server. For a mobile terminated call, an enhanced call control is carried via the mobility management entity to the mobile switching center server, after the mobile switching center server pages the user equipment. The user equipment is offered existing circuit switched domain services while connected to the long term evolution system.

17 Claims, 6 Drawing Sheets

(56) References Cited

OTHER PUBLICATIONS

Nortel; Solutions for Voice Call Continuity between IMS Accessed via SAE/LTE and CS Domain; pp. 1-5; Sep. 2006.
3GPP TR 25.999 v0.4.0; "3rd Generation Partnership Project; Technical Specification Group Radio Access Network; HSPA Evolution Beyond Release 7 (FDD); (Release 7)"; pp. 1-44; Nov. 2006.
3GPP TS 24.008 V7.6.0 (Dec. 2006), "3rd Generation Partnership Project; Technical Specification Group Core Network and Terminals; Mobile Radio Interface Layer 3 Specification; Core Network Protocols; Stage 3 (Release 7)", 539 pages.
3GPP TS 23.060 V7.3.0 (Dec. 2006), "3rd Generation Partnership Project; Technical Specification Group Services and System Aspects; General Packet Radio Service (GPRS); Service Description; Stage 2 (Release 7)", 214 pages.
3GPP TS 23.003 V7.2.0 (Dec. 2006), "3rd Generation Partnership Project; Technical Specification Group Core Network and Terminals; Numbering, Addressing and Identification (Release 7)", 52 pages.

* cited by examiner

CIRCUIT SWITCHED DOMAIN SERVICES WITH LONG TERM EVOLUTION/SYSTEM ARCHITECTURE EVOLUTION ACCESS

CROSS-REFERENCES TO RELATED APPLICATIONS

This application claims priority of U.S. Provisional Patent Application Ser. No. 60/880,965 filed on Jan. 18, 2007. The subject matter of the above referenced application is incorporated by reference.

BACKGROUND OF THE INVENTION

1. Field of the Invention

The present invention relates to a method and apparatus for enabling circuit switched domain services to be used with Long Term Evolution (LTE) mobile devices.

2. Description of the Related Art

Third Generation Partnership Project (3GPP) is in the process of standardizing the UMTS Terrestrial Radio Access Network (UTRAN) Long Term Evolution (LTE) and System Architecture Evolution (SAE). LTE focuses on enhancement of Universal Terrestrial Radio Access (UTRA) and optimization of the UTRAN architecture. Work on the SAE defines an evolved packet core network.

IP Multimedia Subsystem (IMS) is a service platform for operators to support IP multimedia applications. Potential applications include video sharing, Voice over IP (VoIP), streaming video and interactive gaming. IMS enables mixed and dynamic services. For example, a user could be on a voice call but suddenly want to enable a video connection or transfer files. IMS by itself does not provide all of the necessary applications. Rather, it provides a framework of application servers, subscriber databases and gateways to make them possible. The core networking protocol used within IMS is Session Initiation Protocol (SIP), which includes Session Description Protocol (SDP) used to convey configuration information such as supported voice codecs. Other protocols include Real Time Transport Protocol (RTP) and Real Time Streaming Protocol (RTSP) for transporting actual sessions.

A circuit-switched network is a type of network in which a physical path is obtained for and dedicated to a single connection between two end-points in the network for the duration of the connection. A virtual circuit-switched connection is a dedicated logical connection that allows sharing of the physical path among multiple virtual circuit connections.

One of the design targets of an LTE/SAE system is cost optimization, wherein complexity is reduced by focusing on only Internet Protocol (IP) capability. In this system, the circuit switched domain is not supported when a user equipment is connected for LTE/SAE access. It is assumed that all the communication services implemented on top of IP bearers are controlled by the IP multimedia subsystem and by the respective IMS application servers. Therefore, in the LTE/SAE system, the IP multimedia subsystem is needed even if the LTE user equipment is making a simple voice call. As such, an operator must re-implement exactly the same services on the IMS machinery that are used by subscribers in a circuit switched domain in order to offer smooth migration from Second Generation (2G)/Third Generation (3G) systems to future LTE/SAE systems.

Operators require that handovers and service continuity is guaranteed when a subscriber moves across an LTE coverage border. WCDMA and/or GSM are expected to have wider coverage areas than LTE. Currently 3GPP focuses on voice call continuity procedures where a voice call is handed over between packet switched and circuit switched domains. Voice call continuity procedures on LTE/SAE systems are likely to be very complex, thus resulting in challenges associated with seamless and reliable handovers.

It is common to use IMS and SIP based call control for LTE access or other types of IP only access. However, SIP based call control does not offer the same services, for example some supplementary services, as currently implemented and used in circuit switch domains. Voice call continuity has been discussed in 3GPP and several alternatives have been proposed. There are proposals that integrate a mobile switching center (MSC) server tightly to LTE/SAE access in order to improve the voice call continuity handover. However, one thing that is common in all of the current proposals is that the actual call control in LTE/SAE access is always SIP and IMS based, which has been noted above to be inadequate.

SUMMARY

An embodiment of the present invention relates to a method including attaching a user equipment to a long term evolution system and simultaneously registering the user equipment attached to the long term evolution system to a circuit switched domain, based on an interface between a mobility management entity and a mobile switching center server. The method further includes carrying, for a mobile originated call from the user equipment attached to the long term evolution system, an enhanced call control via the mobility management entity to the mobile switching center server. The method further includes carrying, for a mobile terminated call, an enhanced call control via the mobility management entity to the mobile switching center server, after the mobile switching center server pages the user equipment. The user equipment is offered existing circuit switched domain services while connected to the long term evolution system.

Another embodiment of the invention relates to a user equipment including an attaching unit configured to attach the user equipment to a long term evolution system. Upon attachment, the user equipment is simultaneously registered to a circuit switched domain, based on an interface between a mobility management entity and a mobile switching center server. For a mobile originated call from the user equipment attached to the long term evolution system, an enhanced call control is carried via the mobility management entity to the mobile switching center server. For a mobile terminated call, an enhanced call control is carried via the mobility management entity to the mobile switching center server, after the mobile switching center server pages the user equipment. The user equipment is offered existing circuit switched domain services while connected to the long term evolution system.

Another embodiment of the invention is directed to a network device, including an attaching unit configured to attach a user equipment to a long term evolution system. The network device also includes a registration unit configured to simultaneously register the user equipment attached to the long term evolution system to a circuit switched domain, based on an interface between a mobility management entity and a mobile switching center server. The network device also includes a carrying unit configured to carry, for a mobile originated call from the user equipment attached to the long term evolution system, an enhanced call control via the mobility management entity to the mobile switching center server. The network device also includes a carrying unit configured to carry, for a mobile terminated call, an enhanced call control via the mobility management entity to the mobile switching center server, after the mobile switching center server pages the user equipment. The user equipment is offered existing circuit switched domain services while connected to the long term evolution system.

Another embodiment of the invention is directed to an apparatus, including attaching means for attaching a user equipment to a long term evolution system. The apparatus also includes registration means for simultaneously registering the user equipment attached to the long term evolution system to a circuit switched domain, based on an interface between a mobility management entity and a mobile switching center server. The apparatus also includes carrying, for a mobile originated call from the user equipment attached to the long term evolution system, an enhanced call control via the mobility management entity to the mobile switching center server. The apparatus further includes carrying, for a mobile terminated call, an enhanced call control via the mobility management entity to the mobile switching center server, after the mobile switching center server pages the user equipment. The user equipment is offered existing circuit switched domain services while connected to the long term evolution system.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention, wherein.

DETAILED DESCRIPTION OF PREFERRED EMBODIMENTS

Reference will now be made to the preferred embodiments of the present invention, examples of which are illustrated in the accompanying drawings. The present invention relates to defining a method and apparatus for enabling circuit switched domain services to be used with Long Term Evolution (LTE) mobile devices.

Figure 1:
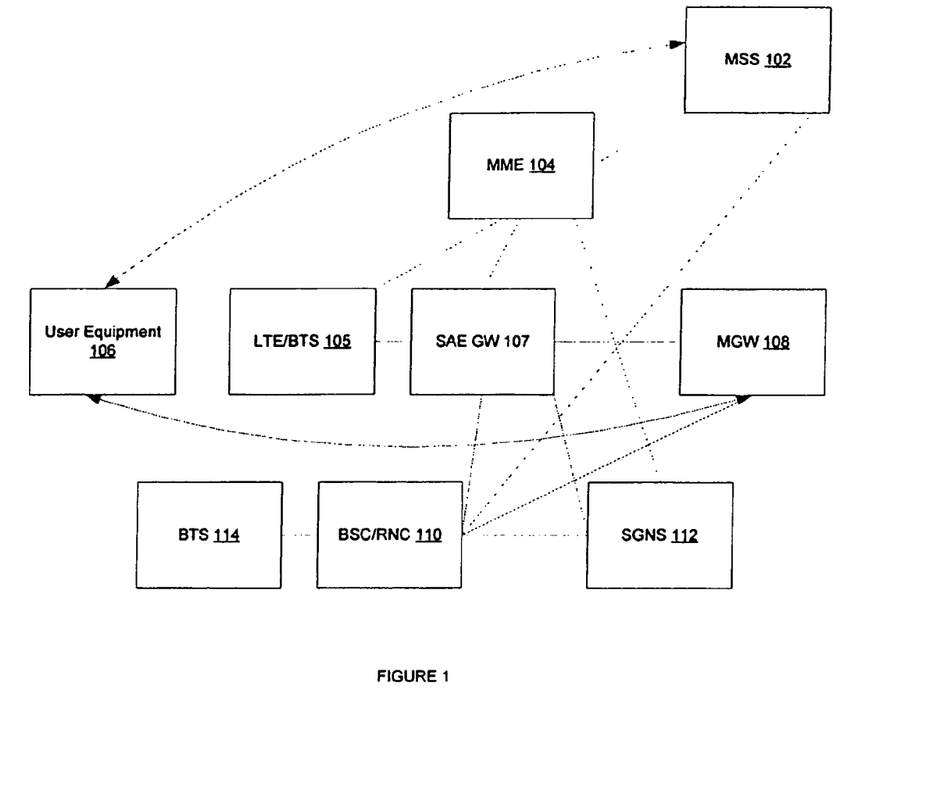
FIG. 1 illustrates a high level LTE/SAE architecture with integration to a circuit switched domain.

FIG. 1 illustrates a high level LTE/SAE architecture with integration to a circuit switched domain. A mobile switching services center server (MSS or MSC-S) 102 performs the switching of calls between a mobile user and other mobile or fixed network users. MSS 102 is connected to a Mobility Management Entity (MME) 104 of the SAE architecture. MME 104 is further connected to LTE eNB (LTE BTS) 105 and SAE gateway (SAE GW) 107. MSS 102 is also connected to MGW 108, wherein voice media is forwarded between a user equipment 106 and MGW 108. SAE GW 107 is further connected to the Base Station Controller (BSC/RNC) 110 of, for example, a GSM network and to a Service GPRS Support Node (SGSN) 112 which serves as a gateway between RNC 110 and the core network of a GPRS/UTMS network. MGW 108 is also connected to BSC/RNC 110. BSC/RNC 110 is further connected to at least one Base Transceiver System 114 which handles radio link protocols with a mobile station.

The present invention enables an operator to deploy LTE/SAE access while continuing to offer the services implemented in an existing circuit switched core for multi-mode 2G/3G/LTE devices. Additionally, the present invention enables simpler handover procedures for voice data when a user moves between LTE and GSM/WCDMA accesses.

In an embodiment of the invention, MSS 102 is tightly connected to MME 104. This simplifies inter-radio access technology handover procedures. MSS 102 could be connected directly to an enhanced node B (eNB), but then MSS 102 would be impacted by the LTE/SAE mobility procedures. However, if MSS 102 is completely separated, then usage of existing inter-radio access technology handover procedures would be impossible.

In an embodiment of the invention, when an LTE user equipment 106 attaches to the LTE/SAE system, user equipment 106 can simultaneously register to a circuit switched domain, based on Gs-like interfaces between MME 104 and MSS 102. In this case, the LTE system information may have to indicate the availability of a circuit switched domain. The LTE system information which indicates the availability of the circuit switched domain may be similar to a network operation mode I and the registration procedure may be similar to a combined GPRS/IMSI attach in GSM/WCDMA. UMTS network can operate in either network mode I or mode II. In mode I, the mobile switching center and the Serving GPRS Support Node are connected together. The primary consequence of mode I is that user equipments are allowed to perform combine GPRS Attach and IMSI Attach procedures and combined Location Update & Routing Area Update procedures. A combined procedure is a single over-the-air procedure that the network treats as if two separate procedures have occurred.

For a mobile originated call from LTE user equipment 106, the enhanced call control may be carried as network access server (NAS) signalling via MME 104, which forwards it to MSS 102. In this case, the interface between MME 104 and MSS 102 could be Iu-CS-like interface. Specifically, the Iu-CS interface could be used to setup subscriber specific signalling link, transfer call control messages between user equipment 106 and MSS 102, and perform inter-radio access technology handovers. Mobile terminated calls are handled in a manner similar to the mobile originated calls, but first, MSS 102 pages user equipment 106 via a Gs-like interface between MME 104 and MSS 102.

The existing call control is enhanced so that the voice media, for example Adaptive Multi-rate (AMR) coded voice, can be carried over IP bearer, because LTE/SAE supports only IP bearers. The Quality of Service (QoS) architecture for LTE/SAE may support QoS for VoIP. For example, SAE GW 107 can setup a dedicated LTE bearer, with higher QoS, for voice media based on QoS policy information. The voice media is forwarded between user equipment 106 and MGW 108. MGW 108 is controlled by MSS 102 and it supports AMR over RTP/UDP/IP.

The handover between radio access technologies is based on similar procedures as currently used between 2G and 3G systems. For example, user equipment 106 connected to an LTE/SAE system may measure the neighbouring GSM and/or WCDMA cells. Based on measurements the eNB can decide that a handover to, for example GSM, is needed. The handover request is sent to MME 104 and MSS 102. MSS 102 forwards the inter-radio access technology handover request to the target system, for example the GSM BSC. The target system prepares resources for a circuit switched call. Finally, inter-radio access technology hand-over command is given to user equipment 106, which then connects to, for example the GSM cell. The handover procedure also switches the voice media from the AMR/RTP/UDP/IP-over-LTE leg to AMR/CS-over-GSM.

The present invention enables an operator to continue to offer the same circuit switched domain services over LTE/SAE accessed system, such that the circuit switched core investment is also secured for the future. Only some additional features are needed in MSS 102/MGW 108 in order to support IP bearers for voice media. The operator does not have to invest in IMS and VoIP application servers in order to benefit from the higher capacity and performance of LTE/SAE access system. Note, however, that the operator can of course offer new services with IMS, but sometimes in a limited coverage area this may not work. For example, a new service may require HSPA/LTE capacity and performance and therefore may not work in a wider GSM/GPRS area.

The end user can still use the familiar service available both in GSM and WCDMA with a new LTE capable device. Because multi-mode 2G/3G/LTE devices support, for example GSM and WCDMA call control, it should not be complex to support a circuit switched domain in LTE/SAE accessed system.

Figure 2:
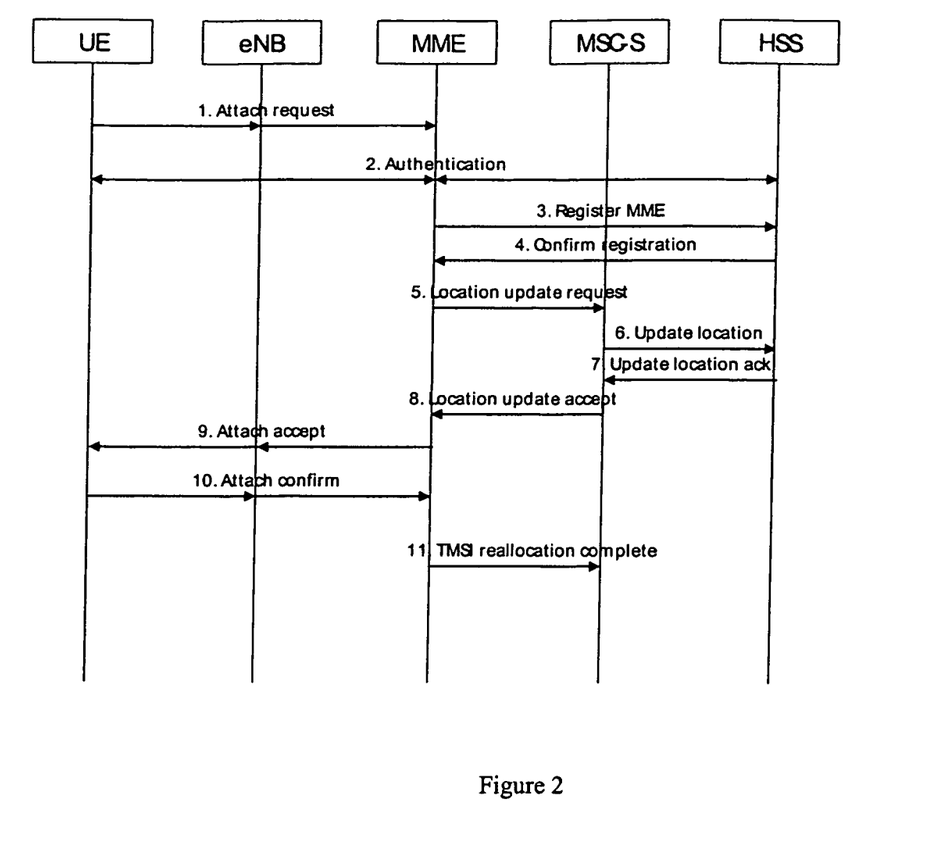
FIG. 2 illustrates an example of a combined network with the LTE/SAE architecture attached to a circuit switched domain.

FIG. 2 illustrates an example of a combined network including the LTE/SAE system attached to a circuit switched domain. In Step 2010, an attach request message is sent from user equipment 106 to MME 104. The request is authenticated with a Home Subscriber Service (HSS) in Step 2020. In Step 2030, MME 104 sends a registration request to HSS. In Step 2040, HSS confirms the registrations to MME 104. In Step 2050, a location update request is sent from MME 104 to MSS 102 and in Step 2060, an update location message is sent from MSS 102 to HSS. In Step 2070, an update location acknowledgement message is sent from HSS to MSS 102 and in Step 2080, and location update accept message is sent from MSS 102 to MME 104. In Step 2090, an attach accept message is sent from MME 104 to user equipment 106 and in Step 2010 an attach confirm message is sent from user equipment 102 to MME 104. In Step 2011, a relocation comment message is sent from MME 104 to MSS 102.

Figure 3:
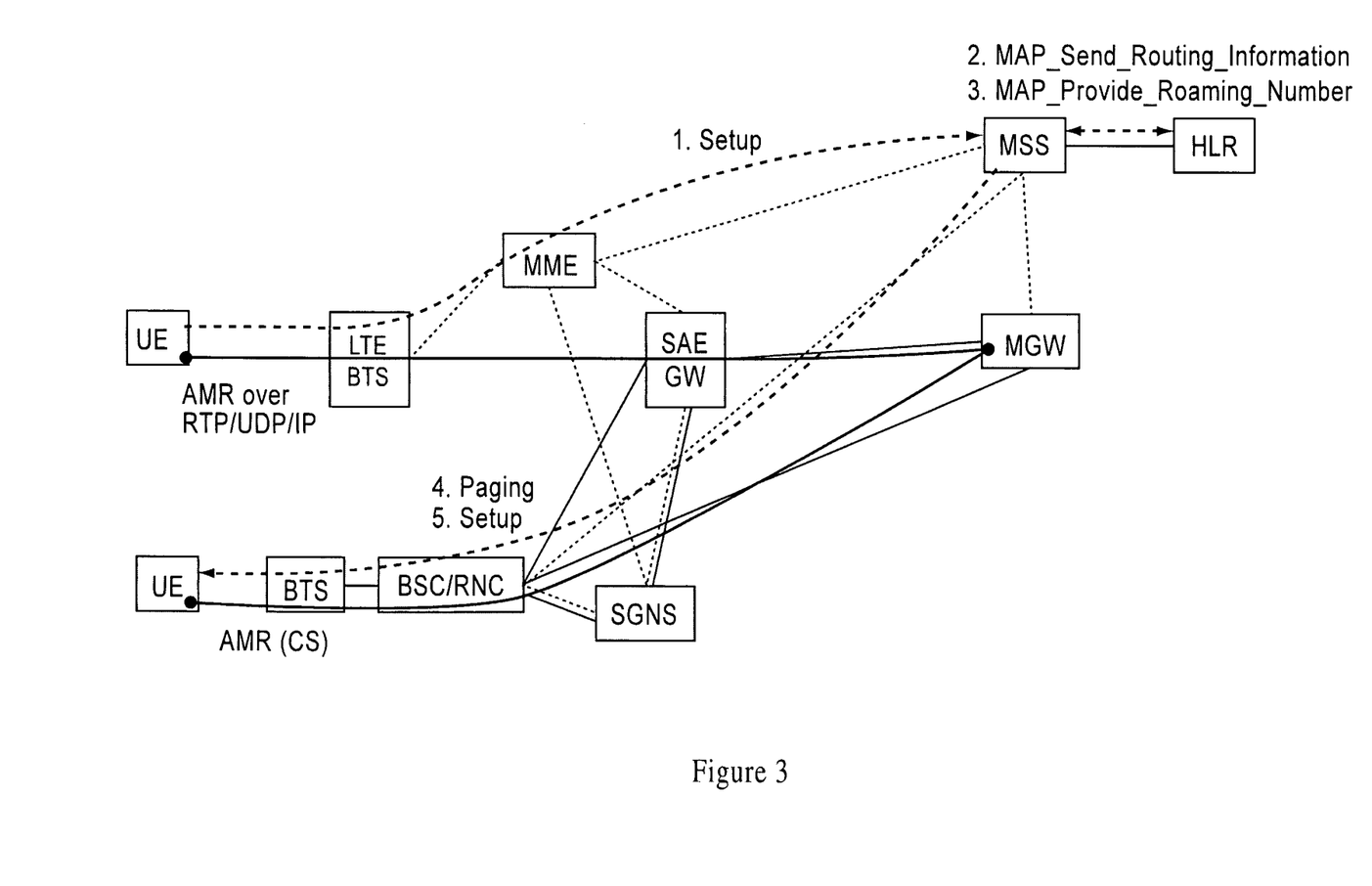
FIG. 3 illustrates a voice call path.

FIG. 3 illustrates a voice call path implemented in an embodiment of the invention. A call setup is sent from user equipment 106 to LTE BTS 105 and MME 104 and on to MSS 102 and HLR. The call is returned from MSS 102 to BSC/RNC 110 and to BTS 114 and then the user equipment in the circuit switched domain. The user plane path after the call is established is from user equipment 106 to LTE BTS 105 to SAE GW 107 to MGW 108 to BSC/RNC 110 and to BTS 114 and then the user equipment in the circuit switched domain.

Figure 4:
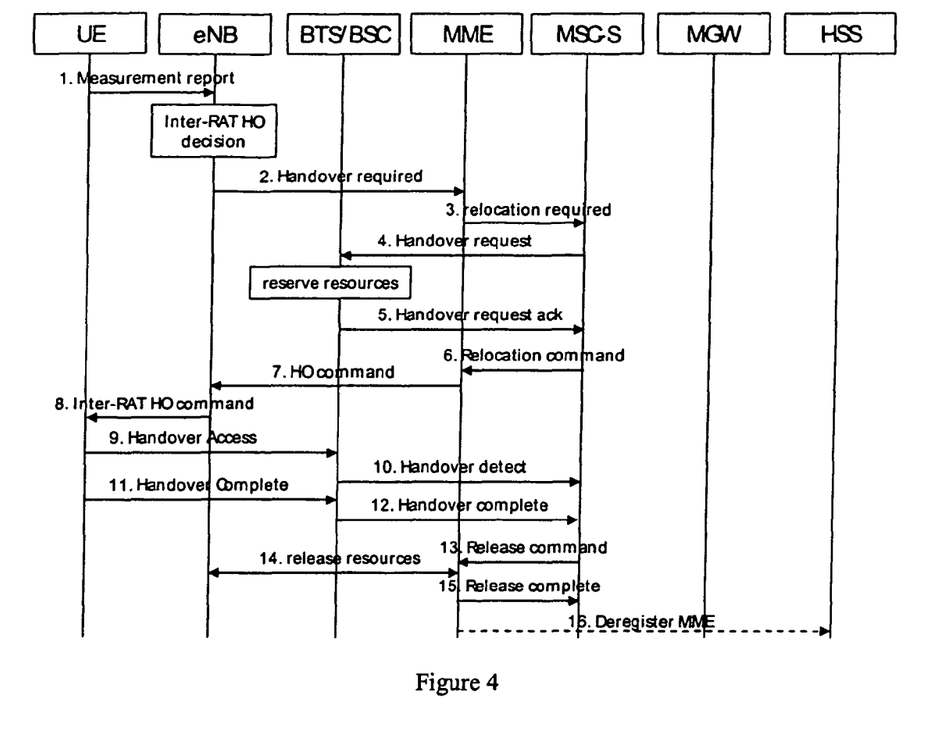
FIG. 4 illustrates a voice handover from a LTE system to a GSM system.

FIG. 4 illustrates the steps implemented in a voice handover from an LTE system to a GSM system. In Step 4010, a measurement report is sent from user equipment 106 to eNB and eNB makes an inter-radio access technology handover decision. In Step 4020, eNB indicates to MME 104 that a handover is required. In Step 4030, MME 104 indicates to MSS 102 that relocation is required. In Step 4040, a handover request is sent from MSS 102 to BSC 114 and BSC 114 reserves the appropriate resources. In Step 4050, the handover request is acknowledged by BSC 114. In Step 4060, a relocation command is sent from MSS 102 to MME 104 and in Step 4070, a handover command is sent from MME 104 to eNB. In Step 4080, an inter-radio access technology handover command is sent from eNB to user equipment 106. In Step 4090, a handover access is sent from user equipment 106 to BSC 114. In Step 4110 a handover detect message is sent from BSC 114 to MSS 102 and in Step 4111, a handover complete message is sent from user equipment 106 to BSC 114. In Step 4112, the handover completer message is sent from BSC 114 to MSS 102 and in Steps 4113, 4114 and 4115 a release command is sent from MSS 102 to MME 104, from MME 104 to eNB and from MME 104 to MSS 102. In Step 4116, MME 104 sends a deregister messages to HSS.

Figure 5:
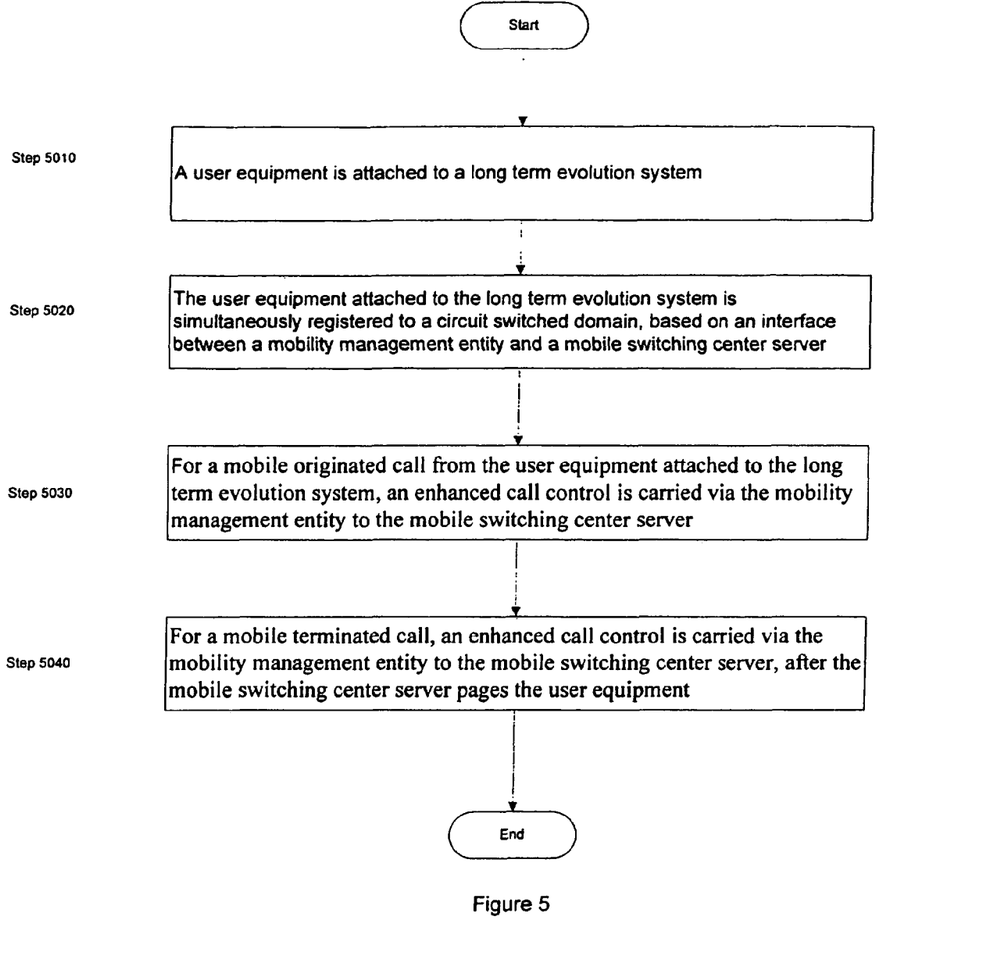
FIG. 5 illustrates an embodiment of the steps implemented in an embodiment of the present invention.

FIG. 5 illustrates an embodiment of the steps implemented in an embodiment of the present invention. In Step 5010, a user equipment is attached to a long term evolution system. In Step 5020, the user equipment attached to the long term evolution system is simultaneously registered to a circuit switched domain, based on an interface between a mobility management entity and a mobile switching center server. In Step 5030, for a mobile originated call from the user equipment attached to the long term evolution system, an enhanced call control is carried via the mobility management entity to the mobile switching center server. In Step 5040, for a mobile terminated call, an enhanced call control is carried via the mobility management entity to the mobile switching center server, after the mobile switching center server pages the user equipment. The user equipment is offered existing circuit switched domain services while connected to the long term evolution system.

Figure 6:
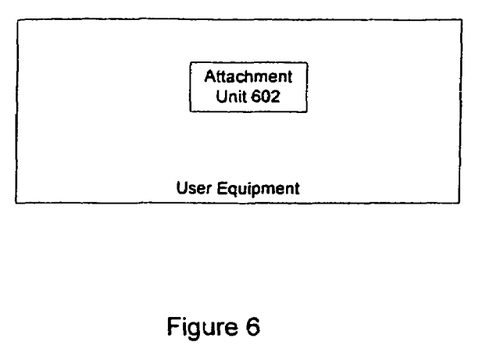
FIG. 6 illustrates a high level view of an embodiment of a user equipment which implements the present invention.

FIG. 6 illustrates a high level view of an embodiment of a user equipment which implements the present invention. The user equipment includes an attaching unit 602 configured to attach the user equipment to a long term evolution system, illustrated in FIG. 7. Upon attachment, the user equipment is simultaneously registered to a circuit switched domain, based on an interface between a mobility management entity and a mobile switching center server. The user equipment is offered existing circuit switched domain services while connected to the long term evolution system.

Figure 7:
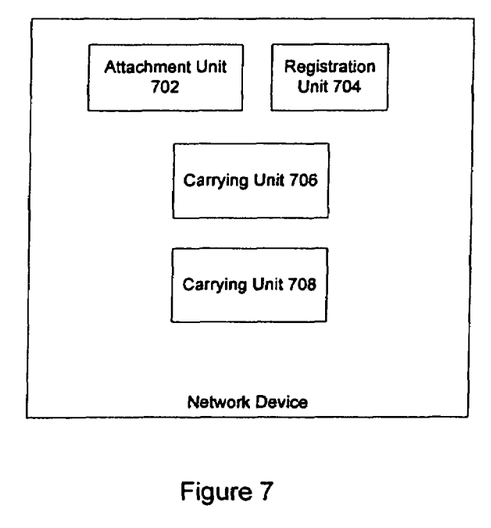
FIG. 7 illustrates a high level view of an embodiment of a network device which implements the present invention.

FIG. 7 illustrates a high level view of an embodiment of a network device which implements the present invention. The network device includes an attaching unit 702 configured to attach a user equipment to a long term evolution system. The network device also includes a registration unit 704 configured to simultaneously register the user equipment attached to the long term evolution system to a circuit switched domain, based on an interface between a mobility management entity and a mobile switching center server. The network device also includes a carrying unit 706 for carrying an enhanced call control via the mobility management entity to the mobile switching center server, for a mobile originated call from the user equipment attached to the long term evolution system. The network device also includes a carrying unit 708 for carrying an enhanced call control is carried via the mobility management entity to the mobile switching center server for a mobile terminated call, after the mobile switching center server pages the user equipment. The user equipment is offered existing circuit switched domain services while connected to the long term evolution system.

It should be appreciated by one skilled in art, that the present invention may be utilized in any device that is implemented on an LTE/SAE system described above. The foregoing description has been directed to specific embodiments of this invention. It will be apparent, however, that other variations and modifications may be made to the described embodiments, with the attainment of some or all of their advantages. Therefore, it is the object of the present invention to cover all such variations and modifications as come within the true spirit and scope of the invention.

What is claimed:

1. A method comprising:
attaching a user equipment to a long term evolution system;
simultaneously registering the user equipment attached to the long term evolution system to a circuit switched domain, based on an interface between a mobility management entity and a mobile switching center server within the long term evolution system; and
receiving, for a mobile terminated call, an enhanced call control signaling message from the user equipment at the mobility management entity, and forwarding the message to the mobile switching center server, the message being received in response to the mobile switching center server paging the user equipment via the mobility management entity,
wherein the user equipment is offered existing circuit switched domain services while connected to the long term evolution system;
receiving a handover request at the mobile switching center server and from an enhanced node B in the long term evolution system for a handover to a target system that is one of a neighboring second generation or third generation cell, wherein the handover request is based on a determination by the enhanced node B that the handover to the target system that is one of the neighboring second generation or third generation cell is needed and the determination is based on a measurement by the user equipment of the neighboring second generation and third generation cells;
forwarding, by the mobile switching center server, an inter-radio access technology handover request to the target system; and
providing the inter-radio access technology handover request to the user equipment for connection to a cell of the target system.

2. The method of claim 1, wherein the interface for simultaneously registering the user equipment attached to the long term evolution system to the circuit switched domain is a Gs interface between the mobile switching center server and the mobility management entity.

3. The method of claim 1, wherein simultaneously registering the user equipment comprises indicating by the long term evolution system that the circuit switched domain is available to the user equipment.

4. The method of claim 1, wherein the interface between the mobile switching center server and the mobility management entity is a Gs interface for the mobile terminated call.

5. The method of claim 1, further comprising: enhancing existing call control so that voice media is carried over an interne protocol bearer.

6. The method of claim 1, further comprising:
measuring, by the user equipment, neighboring second generation and third generation cells;
determining, by an enhanced node B in the long term evolution system, based on the measurement whether a handover to a neighboring second generation or third generation cell is needed;
if a handover is needed, sending a handover request to the mobile switching center server and the mobility management entity;
forwarding, by the mobile switching center server, an inter-radio access technology handover request to a target system, wherein the target system prepares resources for a circuit switched call; and
providing the inter-radio access technology handover request to the user equipment for connection to a cell of the target system.

7. The method of claim 1, wherein the enhanced call control signaling message causes existing call control to be enhanced so that voice media for the mobile terminated call can be carried over an Internet protocol bearer while the voice media is in the long term evolution system and carried over circuit switched resources while the voice media is in the circuit switched domain.

8. The method of claim 1, wherein the enhanced call control signaling message causes existing call control to be enhanced so that voice media for the mobile terminated call can be carried over an Internet protocol bearer.

9. The method of claim 8, wherein in response to a handover procedure of the mobile terminated call from the long term evolution system to a circuit switched domain, switching the voice media from the Internet protocol bearer on the long term evolution system to circuit switched resources on the circuit switched domain.

10. A user equipment comprising:
at least one processor and at least one memory comprising computer-readable code, the at least one processor configured, in response to execution of the computer-readable code, to:
attach the user equipment to a long term evolution system, wherein in response to attachment the user equipment is simultaneously registered to a circuit switched domain, based on an interface between a mobility management entity and a mobile switching center server within the long term evolution system; and
transmit, in response to the mobile switching center server paging the user equipment and for a mobile terminated call, an enhanced call control signaling message from the user equipment toward the mobility management entity, for forwarding by the mobility management entity to the mobile switching center server, and
wherein the user equipment is offered existing circuit switched domain services while connected to the long term evolution system,
measure neighboring second generation and third generation cells,
wherein based on the measurement an enhanced node B in the long term evolution system determines whether a handover to a neighboring second generation or third generation cell is needed, and if a handover is needed, sends a handover request to the mobile switching center server and the mobility management entity,
wherein the mobile switching center server forwards an inter-radio access technology handover request to a target system which prepares resources for a circuit switched call; and
receive the inter-radio access technology handover request for connection to a cell of the target system.

11. The user equipment of claim 10, wherein the at least one processor is further configured, in response to execution of the computer-readable code, to receive an indication from the long term evolution system that the circuit switched domain is available to the user equipment when the user equipment simultaneously registers with the long term evolution system.

12. A network device, comprising:
at least one processor and at least one memory comprising computer-readable code, the at least one processor configured, in response to execution of the computer-readable code, to:
attach a user equipment to a long term evolution system; and
simultaneously register the user equipment attached to the long term evolution system to a circuit switched domain, based on an interface between a mobility management entity and a mobile switching center server within the long term evolution system; and receive, an enhanced call control signaling message at the mobility management entity, and forwarding the message to the mobile switching center server for a mobile terminated call, the message being received in response to the mobile switching center server paging the user equipment via the mobility management entity;

wherein the user equipment is offered existing circuit switched domain services while connected to the long term evolution system;

receive a handover request at the mobile switching center server and from an enhanced node B in the long term evolution system for a handover to a target system that is one of a neighboring second generation or third generation cell, wherein the handover request is based on a determination by the enhanced node B that the handover to the target system that is one of the neighboring second generation or third generation cell is needed and the determination is based on a measurement by the user equipment of the neighboring second generation and third generation cells;

forward, by the mobile switching center server, an inter-radio access technology handover request to the target system; and provide the inter-radio access technology handover request to the user equipment for connection to a cell of the target system.

13. The network device of claim 12, wherein the interface for simultaneously registering the user equipment attached to the long term evolution system to the circuit switched domain is a Gs interface between the mobile switching center server and the mobility management entity.

14. The network device of claim 12, wherein the at least one processor is further configured, in response to execution of the computer-readable code, to indicate that the circuit switched domain is available to the user equipment.

15. The network device of claim 12, wherein the interface between the mobile switching center server and the mobility management entity is a Gs interface for the mobile terminated call.

16. The network device of claim 12, wherein existing call control is enhanced so that voice media is carried over an internet protocol bearer.

17. The network device of claim 12, wherein the at least one processor is further configured, in response to execution of the computer-readable code, to:

receive a measurement of neighboring second generation and third generation cells from the user equipment;

determine, based on the measurement, whether a handover to a neighboring second generation or third generation cell is needed;

send, if a handover is needed, a handover request to the mobile switching center server and the mobility management entity;

forward an inter-radio access technology handover request to a target system, wherein the target system prepares resources for a circuit switched call; and provide the inter-radio access technology handover request to the user equipment for connection to a cell of the target system.

\* \* \* \* \*

UNITED STATES PATENT AND TRADEMARK OFFICE
CERTIFICATE OF CORRECTION

| | |
|---|---|
| PATENT NO. | : 9,125,239 B2 |
| APPLICATION NO. | : 12/007650 |
| DATED | : September 1, 2015 |
| INVENTOR(S) | : Aalto |

It is certified that error appears in the above-identified patent and that said Letters Patent is hereby corrected as shown below:

In the claims

Claim 5, col. 7, line 50 delete "interne" and insert --internet--.

Signed and Sealed this
Eighth Day of December, 2015

Michelle K. Lee
*Director of the United States Patent and Trademark Office*